(12) United States Patent
Shoner

(10) Patent No.: US 7,984,736 B1
(45) Date of Patent: Jul. 26, 2011

(54) CELLULAR TIRE LINER AND AIR CHAMBER SYSTEM FOR PNEUMATIC TIRES

(76) Inventor: Douglas Joseph Shoner, Hawthorne, CA (US)

( * ) Notice: Subject to any disclaimer, the term of this patent is extended or adjusted under 35 U.S.C. 154(b) by 1840 days.

(21) Appl. No.: 10/377,984

(22) Filed: Mar. 1, 2003

Related U.S. Application Data

(62) Division of application No. 09/798,403, filed on Mar. 2, 2001, now Pat. No. 6,568,443.

(60) Provisional application No. 60/197,184, filed on Apr. 14, 2000.

(51) Int. Cl.
| | |
|---|---|
| B60C 17/06 | (2006.01) |
| B60C 17/04 | (2006.01) |
| B60C 17/00 | (2006.01) |
| B60C 5/00 | (2006.01) |
| B60C 5/04 | (2006.01) |
| B60C 19/12 | (2006.01) |
| B60C 7/10 | (2006.01) |
| B60C 7/12 | (2006.01) |

(52) U.S. Cl. .......................... 152/157; 152/312; 152/316
(58) Field of Classification Search .................. 152/157, 152/312–314, 316–322
See application file for complete search history.

(56) References Cited

U.S. PATENT DOCUMENTS

| | | | | |
|---|---|---|---|---|
| 3,022,810 | A * | 2/1962 | Lambe .......................... | 152/157 |
| 5,031,679 | A * | 7/1991 | Shoner .......................... | 152/157 |
| 5,685,925 | A | 11/1997 | Riquier et al. | |
| 6,170,545 | B1 * | 1/2001 | Kobayashi et al. ........... | 152/157 |

FOREIGN PATENT DOCUMENTS

| | | |
|---|---|---|
| GB | 8437 | 0/1897 |
| GB | 193600 | 3/1923 |

* cited by examiner

*Primary Examiner* — Adrienne C Johnstone

(57) ABSTRACT

A cellular tire liner and air chamber system for pneumatic tires comprising a cellular tire liner interposed between the interior surface of a tire and an air chamber with an annular interface that extends from the air chamber to the interior surface of the tire, in the tread area of the tire and disconnects the sidewall portions of the tire liner from each other.

7 Claims, 6 Drawing Sheets

F I G. 6
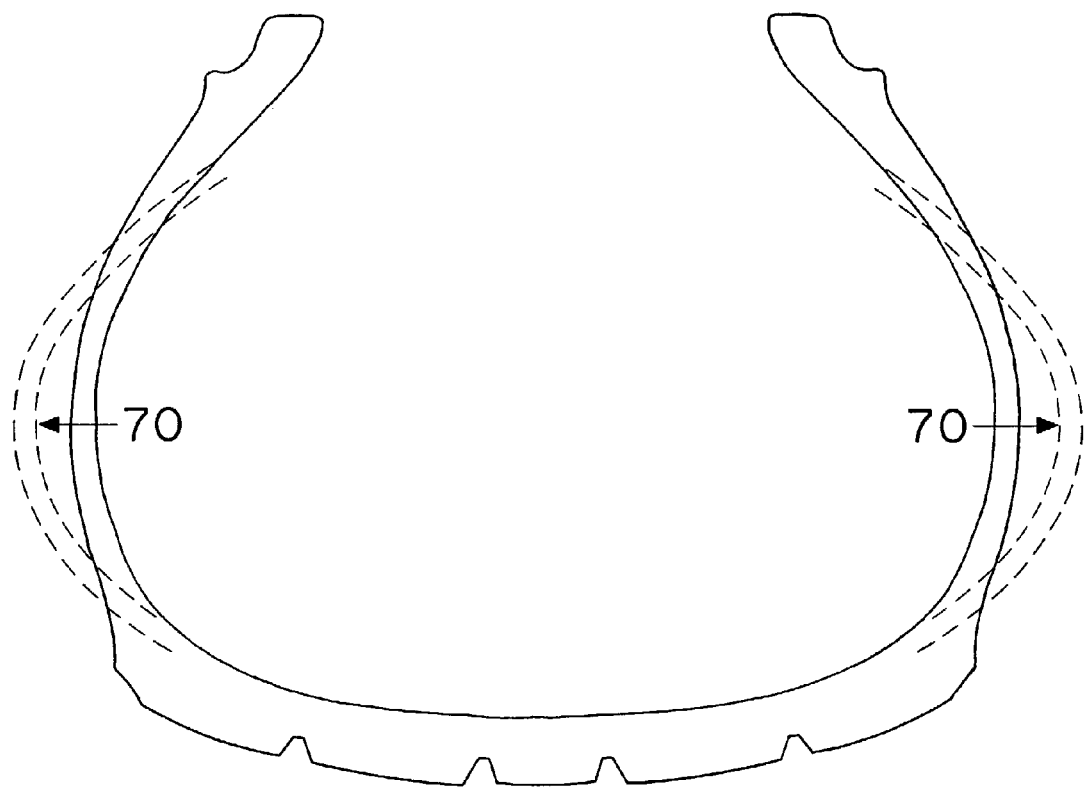

US 7,984,736 B1

CELLULAR TIRE LINER AND AIR CHAMBER SYSTEM FOR PNEUMATIC TIRES

This nonprovisional utility patent application is a Division of application Ser. No. 09/798,403 Filed on Mar. 2, 2001, now U.S. Pat. No. 6,568,443, granted May 27, 2003, which claims the benefit of U.S. Provisional Application No. 60/197,184 filed on Apr. 14, 2000.

BACKGROUND OF THE INVENTION

The present invention is in the field of "flat-proofing" pneumatic tires. The present invention is an improved Cellular Tire Liner and Air Chamber System for pneumatic tires that can be utilized with existing one-piece drop center wheels. And is primarily for use in high aspect ratio pneumatic tires. The aspect ratio is the sidewall height of a tire, divided by its maximum section width, Aspect ratios are commonly referred to in percentages of sidewall height relative to tire width A cellular tire liner lines the interior surface of a pneumatic tire with a given thickness, providing a void in the center of the tire for a subsequently pressurized air chamber. Because the tire liner does not completely fill the interior of the tire, a tire equipped with a "liner" can be mounted onto existing one-piece, Original Equipment Manufactured (O.E.M.) wheels. As almost all tire punctures encountered during driving penetrate the tire maybe a couple of inches, the Cellular Tire Liner and Air Chamber System of the present invention will make a tire blow-out proof and flat-proof. Because the entire volume of compressed air inside the tire can never be lost due to a puncture, or if a portion of the tire fails. And in the event a puncture does penetrate all the way through the liner and depressurizes the air chamber, the liner itself provides sufficient load-bearing capability to allow the vehicle to be driven to a safe location to change the tire. Depressurizing the air chamber is the equivalent of releasing that same volume of compressed air out of a regular tire. The tire would be "low", but it still could be driven to a safe location.

High tire deflections cannot result in an extreme tension load being placed on a tire liner. A tire liner for a high aspect ratio tire should be under a compression load only.

BRIEF SUMMARY OF THE INVENTION

The object of the present invention is to provide a functional means of eliminating pneumatic tire blow-outs and flats for high aspect ratio tires/high deflection applications, that can be utilized with existing one-piece drop center wheels. The present invention Cellular Tire Liner and Air Chamber System provides an annular interface which disconnects the sidewall portions of the Cellular Tire Liner from each other. Thereby eliminating a key detrimental tension load during high tire deflections.

BRIEF DESCRIPTION OF THE DRAWINGS

FIG. 6 is a superimposed illustration of the sidewalls of a high aspect ratio tire deflecting under a load.

REFERENCE NUMERALS IN THE DRAWINGS

15—Pneumatic Tire with Large Sidewalls
20—Interior Surface of the Pneumatic Tire
25—Inner Tube
30—One-Piece Drop Center Wheel
40—An Exterior Surface of the Present Invention Tire Liner that is Parallel to the Rotational Axis of the Tire
50—View that Looks Perpendicular at the Air Chamber Surface and the Surface that Contacts Adjacent Liner Segments
50—Air Chamber
65—Tire Tread
70—Pneumatic Tire Sidewall Deflecting Under A Load
85—Annular Interface
95—Rotational Axis of the Tire
200—Cellular Tire Liner of the Present Invention

DETAILED DESCRIPTION OF THE INVENTION

The Cellular Tire Liner of the present invention is a cellular structure comprised of a multiplicity of elastomeric cells. The construction of "elastomeric cellular structures" for use in the interior of pneumatic tires is well known in the art. The Tire Liner of the present invention can be made by any of the methods known in the art. The preferred elastomeric cellular structure to be used for the Tire Liner of the present invention, is described in Applicant's U.S. Pat. Nos. 5,031,679 and 5,080,737. The composite cellular structure described therein, provides a lightweight structure that fulfills the requirements for use in pneumatic tires. Specifically, the preferred elastomeric cellular structure comprises a multiplicity of preconstructed cells comprising enclosed hollow cavities. Prior to being incorporated into the cellular tire liner, each of the preconstructed cells is a complete, individual structure. Each of the preconstructed cells comprises an external surface and an internal surface, defining one complete cell wall therebetween of a given thickness, completely enclosing a single hollow center of a given volume. The cell walls are composed of an elastomeric material, and the hollow center of the preconstructed cells contain a gas under pressure above atmospheric. The multiplicity of preconstructed, individual cells have surface portions of the external cell wall surfaces which are engaged with external cell wall surface portions of adjacent cells in a state whereby substantially all of the total external cell wall surface of all cells is in engagement with surrounding portions of external cell wall surfaces of the surrounding cells. The multiplicity of preconstructed, individual cells are permantly connected together at the engaged external surface portions in the engaged state to collectively provide the cellular tire liner, whereby the cells of the cellular tire liner remain in the connected and the engaged state.

Figure 1:
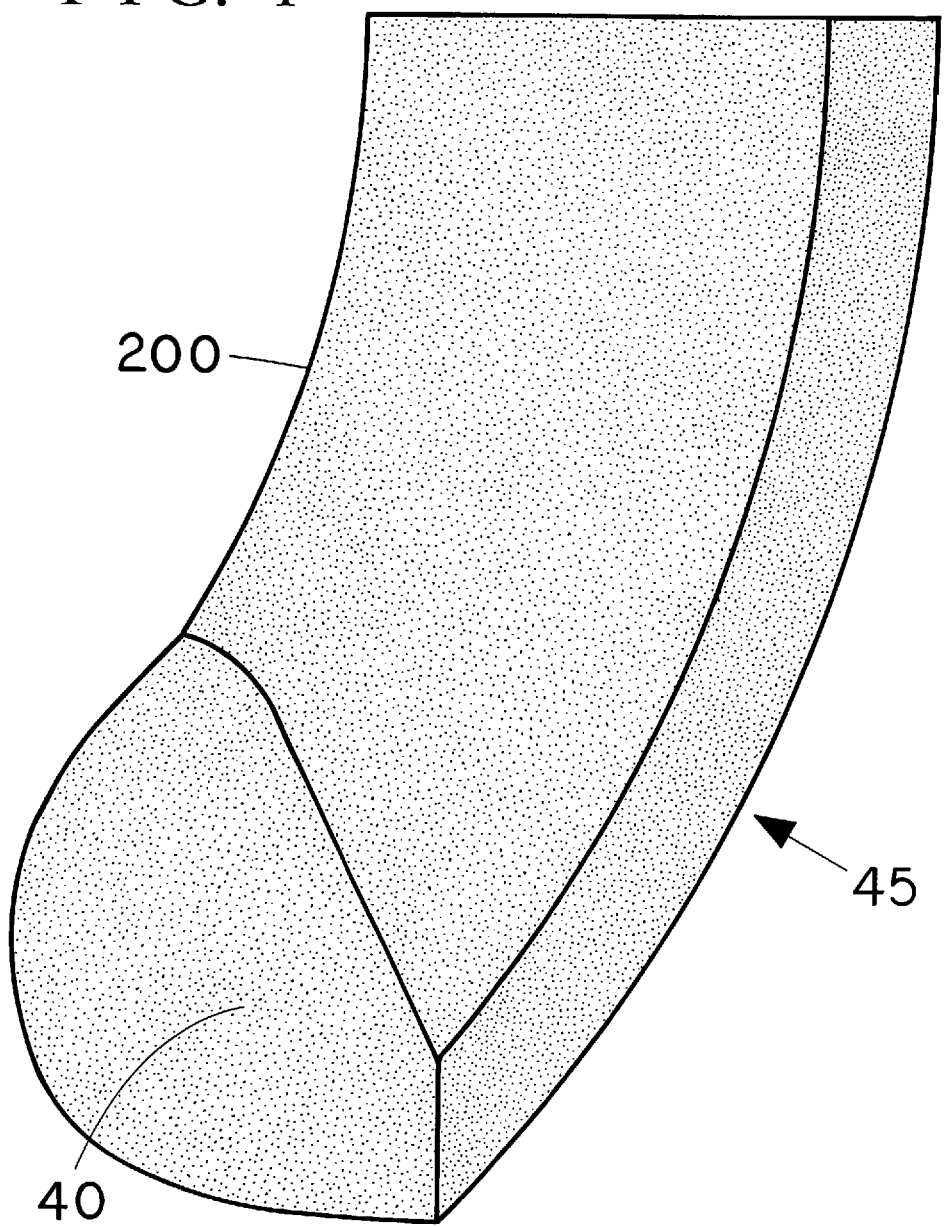
FIG. 1 is an isometric view of one (1) 90 degree Cellular Tire Liner segment of the present invention.

In FIG. 1 there is shown an isometric view of one (1) Cellular Tire Liner 200 of the present invention and view 45 that looks square to the indicated surface. The Liner 200 shown in FIG. 1, is in a 90 degree segment configuration. In a 90 degree segment configuration, it will take eight (8) 90 degree liner segments 200 to completely line the inside of a tire. If the Tire Liner of the present invention is molded in 45 degree segments, it will take sixteen (16) to line the inside of a tire. If the Tire Liner of the present invention is molded in 180 degree segments, it will take four (4) to line the inside of a tire. If the Tire Liner of the present invention is molded in 360 degree segments, it will take two (2) to line the inside of a tire. The Cellular Tire Liner of the present invention can be molded in any "degree" configuration desired.

Figure 2:
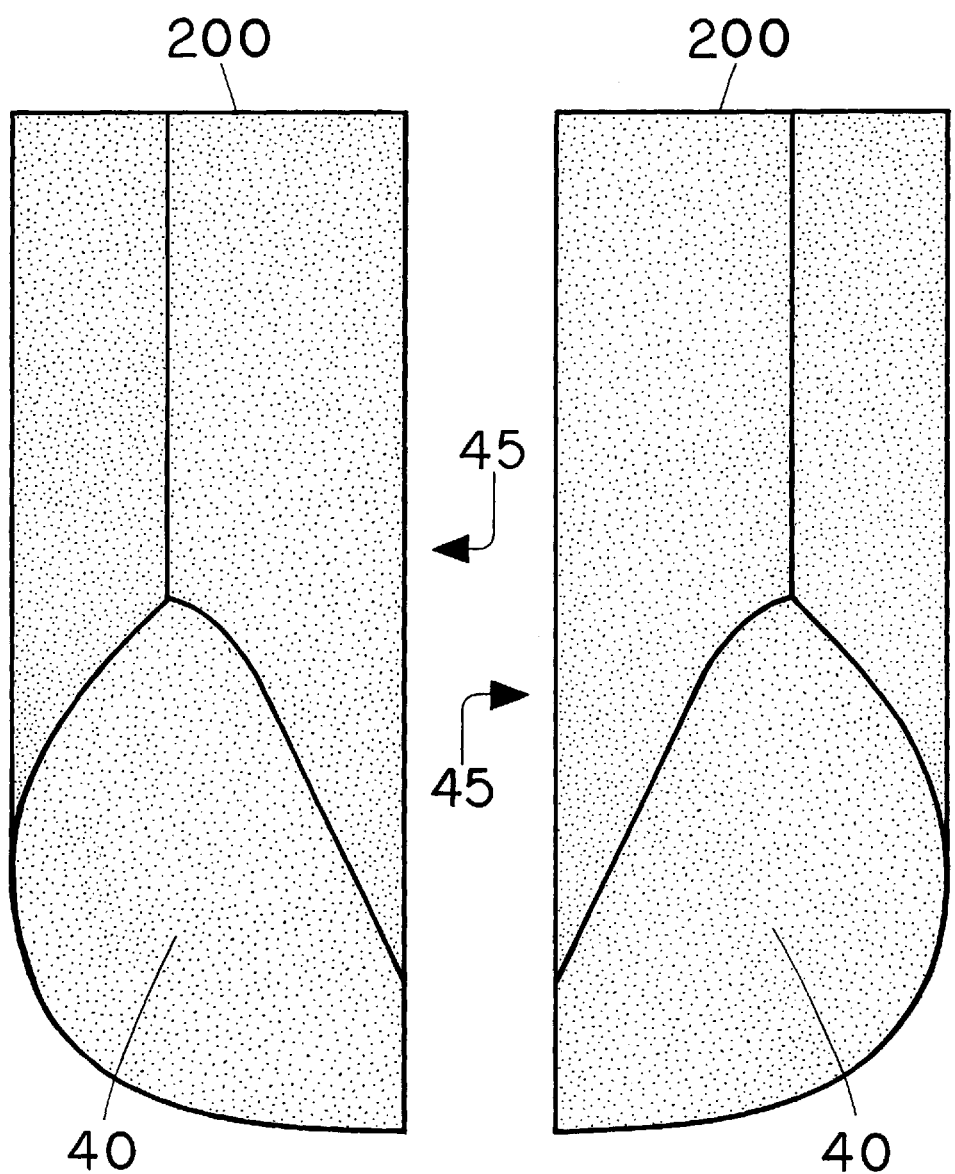
FIG. 2 is a view of two (2) of the 90 degree Liner segments shown in FIG. 1 positioned approximately as they would be oriented inside a tire but spaced apart to show that each is an individual structure.

In FIG. 2 there is shown view 45 and two (2) of the Liner segments 200 shown in FIG. 1, positioned approximately as they would be oriented to each other in a tire, but spaced apart to show they are two independent structures. And that two (2) are required to line the cross section that is parallel with the rotational axis of a tire.

Figure 3:
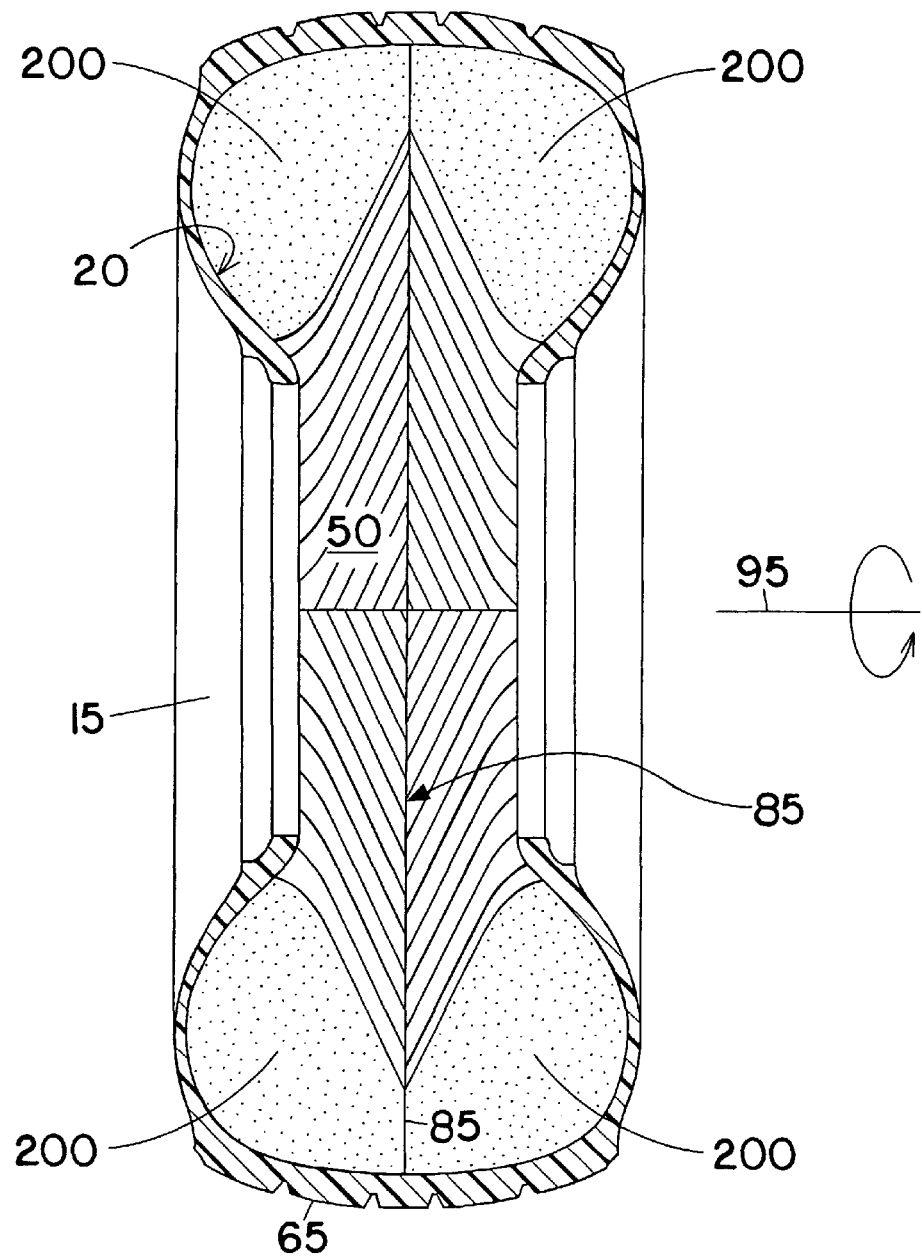
FIG. 3 is a cross sectional view that is parallel with the rotational axis of the tire, illustrating four (4) of the Liners shown in FIG. 1 installed in a tire.

A cross sectional view of a tire lined with the present invention Tire Liner is shown in FIG. 3. FIG. 3 is a cross sectional view that is on and parallel to the rotational axis of the tire. In FIG. 3 there is shown high aspect ratio/large sidewall tire 15, interior surface 20, tire tread 65, four (4) of the Tire Liners 200 shown in FIG. 1, air chamber 50 unpressurized, annular interface 85 and rotational axis 95. Tire 15 has an aspect ratio of approximately 80% (the sidewall height is 80% of the maximum section width). Tire Liner 200 of the present invention, provides for air chamber 50 by creating a void in the interior of tire 15. Air chamber 50 as shown in FIG. 3, is not sealed or pressurized. Air chamber 50 is subsequently sealed by an inner tube or any other suitable means and pressurized with air or any other suitable gas to a desired pressure. Tire Liner 200 "lines" the interior of tire 15 by being interposed between interior surface 20 and air chamber 50. Each of Tire Liners 200, provides a part of air chamber 50. The eight (8) Tire Liners 200 required to completely line tire 15, collectively form air chamber 50.

Figure 4:
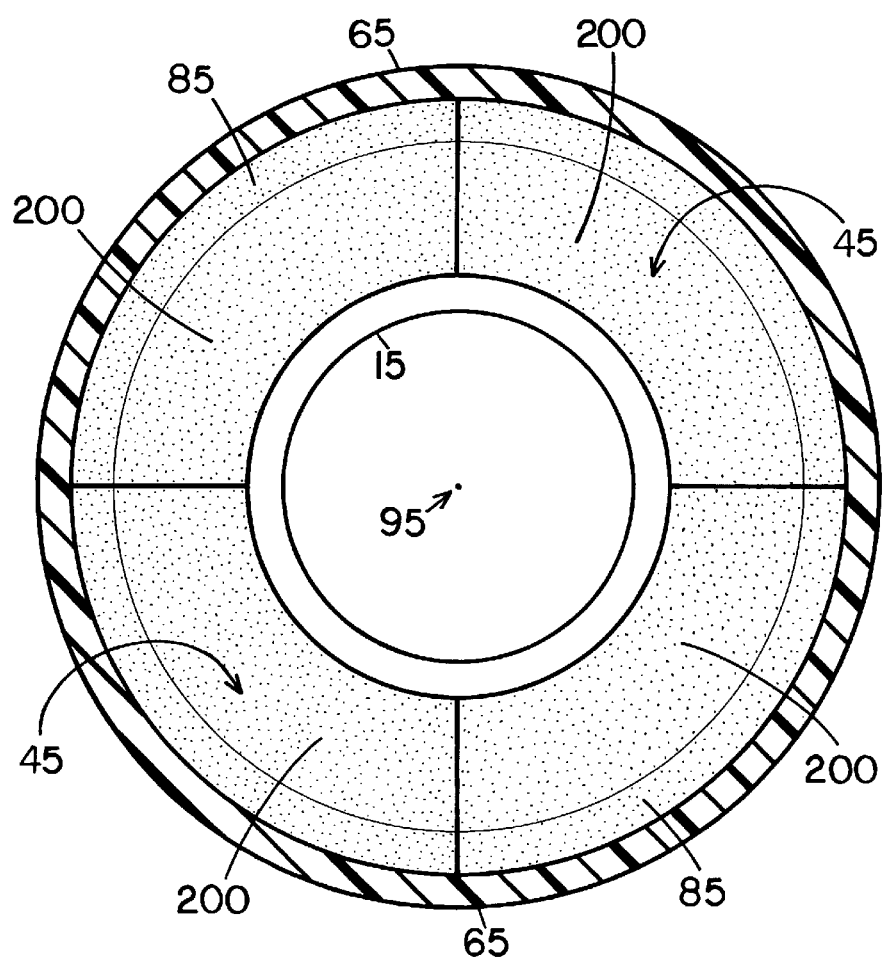
FIG. 4 is a cross sectional view that is perpendicular to the rotational axis of the tire, illustrating four (4) of the Liners shown in FIG. 1 installed in a tire.

FIG. 4 is a cross sectional view of the tire and present invention Tire Liner of FIG. 3, that is perpendicular to the rotational axis of the tire. In FIG. 4 there is shown high aspect ratio/large sidewall tire 15, tire tread 65, four (4) of the Tire Liners 200 shown in FIG. 1, view 45, rotational axis 95 and annular interface 85. Annular interface 85 is established when a multiplicity of Tire Liners of the present invention are installed in and line the interior of a pneumatic tire. In FIG. 4, annular interface 85 can clearly be seen in its entirety. Annular interface 85 is the ring-shaped surface that forms a common boundary between Tire Liners 200 in tire 15. This common boundary between Tire Liners 200 (annular interface 85), is clearly seen in FIG. 3. Annular interface 85 extends from air chamber 50 to interior surface 20 in tread area 65 of tire 15. FIG. 3 shows that annular interface 85 provides a two-piece cross section which disconnects the sidewall portions of the present invention Tire Liner from each other. Because the sidewalls of a pneumatic tire move in opposite directions during load deflection, the annular interface feature of the present invention eliminates extreme tension loads during high tire deflections because the sidewall portions are not connected together.

This sidewall movement in opposite directions is illustrated in FIG. 6. FIG. 6 shows the sidewall movement of a pneumatic tire deflecting under a load 70. The sidewall portions of the present invention Tire Liner can "move" in the required opposite directions, independent of each other during high tire deflections, because they are not connected together. This eliminates the tension load of the prior art tire liners because their sidewall portions are connected together in one continuous structure.

Figure 5:
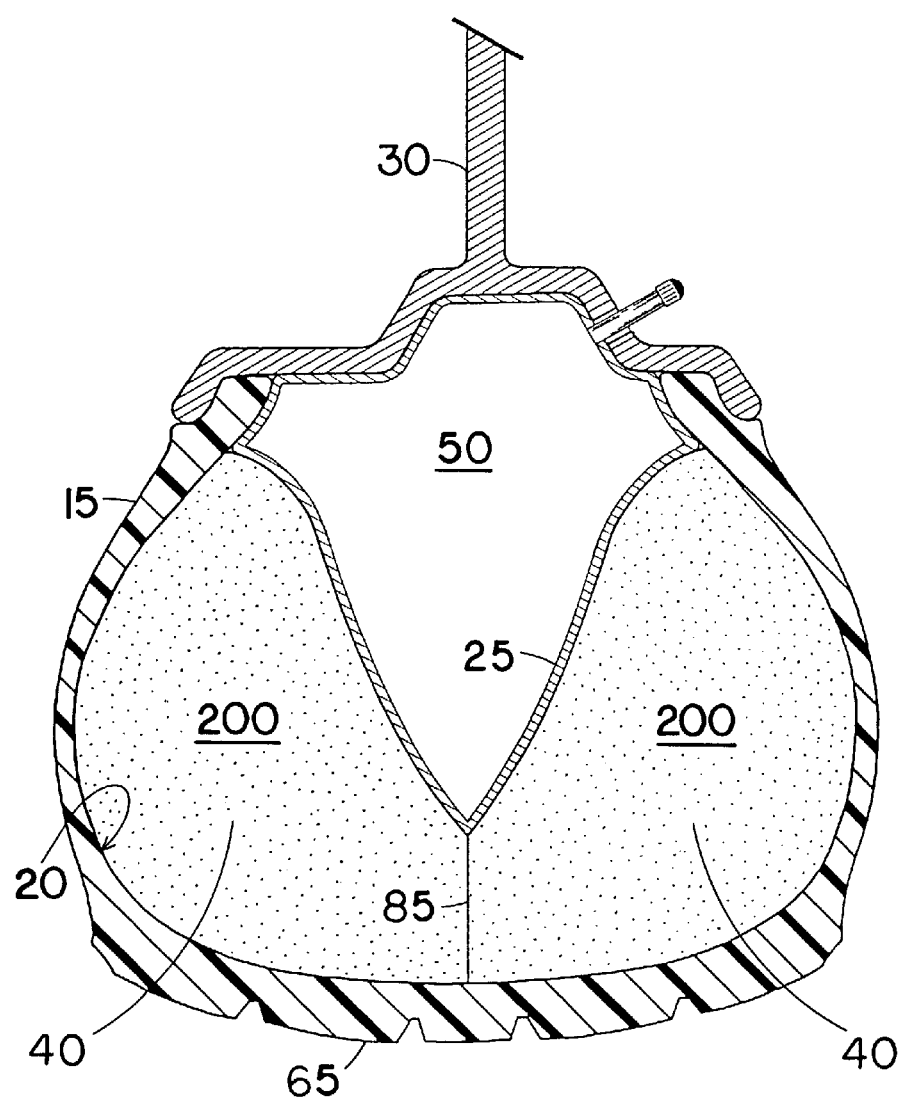
FIG. 5 is a partial cross sectional view of a tire and wheel assembly with the present invention Tire Liners installed for use and the air chamber pressurized.

FIG. 5 is a partial cross sectional view of the tire and present invention Tire Liner of FIG. 3 mounted onto a wheel with the Air Chamber sealed and pressurized. In FIG. 5 there is shown one-piece drop center wheel 30, high aspect ratio/large sidewall tire 15, interior surface 20, tire tread 65, air chamber 50 pressurized, inner tube 25, annular interface 85, Tire Liners of the present invention 200 and exterior surface that is parallel 40. Tire 15 is mounted onto one-piece drop center wheel 30 with the Tire Liners of the present invention 200 lining the interior of tire 15. Tire Liners 200 are interposed between interior surface 20 and air chamber 50. In FIG. 5, air chamber 50 has been sealed by means of inner tube 25 and air chamber 50 is also pressurized. The air pressure force in air chamber 50 presses Tire Liners 200 against interior surface 20 of tire 15. This constant pressure from pressurized air chamber 50 stops Tire Liners 200 from rubbing against interior surface 20 and therefore stops the heat that would be generated by this friction, when tire 15 is put to use. Pressurized air chamber 50 also provides part of the total load-bearing capability of tire 15, because Liners 200 and pressurized Air Chamber 50 function together as a System that establishes the entire load-bearing capability of the tire.

If an "inner tube" is the means chosen to seal air chamber 50, some steps can be taken to insure that it will not protrude into the area that is annular interface 85 during high load deflections. This may be necessary because the sidewall portions of the present invention Tire Liner can "move" independently in opposite directions during high load deflections. A degree of interference could be molded into Tire Liners 200 in the area that will be annular interface 85. This interference will compress together the surfaces that comprise annular interface 85 when Tire Liners 200 are installed in a tire. The amount of compression that may be required, depending on the specific aspect ratio of a tire, could be approximately ¼ to ⅜ of an inch. Alternatively, a "lip" could be molded on the exterior surface of Tire Liners 200 at the junction where annular interface 85 and air chamber 50 meet. Still further, a "lip" and "compression" could possibly be used together. A special inner tube could also be used with a "lip" and/or "compression" or alone. A special inner tube would incorporate means of stopping protrusion into annular interface 85 during high tire/load deflections. This "special inner tube" could incorporate fiber reinforcement, Kevlar® for example, to stop protrusion into annular interface 85 during high tire deflections.

What is claimed is:

1. A cellular tire liner and air chamber system for lining the interior of a pneumatic tire, said system comprising:
  a. a cellular tire liner having an elastomeric cellular structure composed of a multiplicity of elastomeric cells;
  b. an air chamber for said interior of said pneumatic tire that is subsequently sealed and pressurized;
  c. when said cellular tire liner and air chamber system is lining said interior of said pneumatic tire, said cellular tire liner being interposed between the interior surface of said pneumatic tire and said air chamber;
  d. when said cellular tire liner and air chamber system is lining said interior of said pneumatic tire, a multiplicity of said cellular tire liners are used in said interior to line said pneumatic tire, said multiplicity of said cellular tire liners establishing an annular interface;
  e. each of said cellular tire liners in said multiplicity of said cellular tire liners are individual and independent from other said cellular tire liners in said multiplicity;
  f. said annular interface being a ring-shaped surface forming a common boundary between said individual and independent cellular tire liners whereby said annular interface disconnects the sidewall portions of said cellular tire liner from each other allowing said sidewall portions to move in opposite directions during load deflection, unconnected to one another;

g. when said cellular tire liner and air chamber system is lining said interior of said pneumatic tire, said annular interface extends from said air chamber to said interior surface of said pneumatic tire, in the tread area of said pneumatic tire;

h. when said cellular tire liner and air chamber system is lining said interior of said pneumatic tire and said pneumatic tire is mounted onto a wheel, upon pressurization of said air chamber, said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

2. The cellular tire liner and air chamber system of claim 1, wherein said elastomeric cellular structure is composed of a multiplicity of elastomeric closed cells.

3. A pneumatic tire including a cellular tire liner and air chamber system lining the interior of said pneumatic tire, said system lining said interior of said pneumatic tire comprising:

a. a cellular tire liner having an elastomeric cellular structure composed of a multiplicity of elastomeric cells;

b. an air chamber in said interior of said pneumatic tire that is subsequently sealed and pressurized;

c. said cellular tire liner being interposed between the interior surface of said pneumatic tire and said air chamber;

d. a multiplicity of said cellular tire liners are used in said interior to line said pneumatic tire, said multiplicity of said cellular tire liners establishing an annular interface;

e. each of said cellular tire liners in said multiplicity of said cellular tire liners in said interior of said pneumatic tire, are individual and independent from other said cellular tire liners in said interior of said pneumatic tire;

f. said annular interface being a ring-shaped surface forming a common boundary between said individual and independent cellular tire liners in said interior of said pneumatic tire whereby said annular interface disconnects the sidewall portions of said cellular tire liner from each other allowing said sidewall portions to move in opposite directions during load deflection, unconnected to one another;

g. said annular interface extends from said air chamber to said interior surface of said pneumatic tire, in the tread area of said pneumatic tire;

h. when said lined pneumatic tire is mounted onto a wheel and said air chamber is sealed and pressurized, said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

4. The pneumatic tire of claim 3, wherein said elastomeric cellular structure is composed of a multiplicity of elastomeric closed cells.

5. An assembly comprising a pneumatic tire mounted on a wheel, said pneumatic tire including a cellular tire liner and air chamber system lining the interior of said pneumatic tire, said system lining said interior of said pneumatic tire in said assembly comprising:

a. a cellular tire liner having an elastomeric cellular structure composed of a multiplicity of elastomeric cells;

b. an air chamber in said interior of said pneumatic tire that is sealed and pressurized;

c. said cellular tire liner being interposed between the interior surface of said pneumatic tire and said air chamber;

d. a multiplicity of said cellular tire liners are used in said interior to line said pneumatic tire, said multiplicity of said cellular tire liners establishing an annular interface;

e. each of said cellular tire liners in said multiplicity of said cellular tire liners in said interior of said pneumatic tire, are individual and independent from other said cellular tire liners in said interior of said pneumatic tire;

f. said annular interface being a ring-shaped surface forming a common boundary between said individual and independent cellular tire liners in said interior of said pneumatic tire whereby said annular interface disconnects the sidewall portions of said cellular tire liner from each other allowing said sidewall portions to move in opposite directions during load deflection, unconnected to one another:, g. said annular interface extends from said air chamber to said interior surface of said pneumatic tire, in the tread area of said pneumatic tire;

h. said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

6. The assembly of claim 5, wherein said elastomeric cellular structure is composed of a multiplicity of elastomeric closed cells.

7. A cellular tire liner and air chamber system for lining the interior of a pneumatic tire, said system comprising:

a. a cellular tire liner having a multiplicity of preconstructed cells comprising enclosed hollow cavities;

b. prior to being incorporated into said cellular tire liner, each of said preconstructed cells is a complete, individual structure;

c. each of said preconstructed cells comprises an external surface and an internal surface, defining one complete cell wall therebetween of a given thickness, completely enclosing a single hollow center of a given volume;

d. said cell wall is composed of an elastomeric material;

e. said hollow center of said preconstructed cells containing a gas within said hollow center under pressure above atmospheric;

f. said multiplicity of preconstructed, individual cells having surface portions of said external cell wall surfaces engaged with external cell wall surface portions of adjacent cells in a state whereby substantially all of the total external cell wall surface of all cells is in engagement with surrounding portions of external cell wall surfaces of said surrounding cells;

g. said multiplicity of preconstructed, individual cells are permanently connected together at said engaged external surface portions in said engaged state to collectively provide said cellular tire liner, whereby the cells of said cellular tire liner remain in said connected and said engaged state;

h. an air chamber for said interior of said pneumatic tire that is subsequently sealed and pressurized;

i. when said cellular tire liner and air chamber system is lining said interior of said pneumatic tire, said cellular tire liner being interposed between the interior surface of said pneumatic tire and said air chamber;
j. when said cellular tire liner and air chamber system is lining said interior of said pneumatic tire, a multiplicity of said cellular tire liners are used in said interior to line said pneumatic tire, said multiplicity of said cellular tire liners establishing an annular interface;
k. each of said cellular tire liners in said multiplicity of said cellular tire liners are individual and independent from other said cellular tire liners in said multiplicity;
l. said annular interface being a ring-shaped surface forming a common boundary between said individual and independent cellular tire liners whereby said annular interface disconnects the sidewall portions of said cellular tire liner from each other allowing said sidewall portions to move in opposite directions during load deflection, unconnected to one another;
m. when said cellular tire liner and air chamber system is lining said interior of said pneumatic tire, said annular interface extends from said air chamber to said interior surface of said pneumatic tire, in the tread area of said pneumatic tire;
n. when said cellular tire liner and air chamber system is lining said interior of said pneumatic tire and said pneumatic tire is mounted onto a wheel, upon pressurization of said air chamber, said pressurized air chamber exerts a constant force on said multiplicity of said cellular tire liners and presses said multiplicity of said cellular tire liners against said interior surface of said pneumatic tire, whereby said pressurized air chamber completes the required force necessary to establish the entire load bearing capability of said pneumatic tire when said air chamber is sufficiently pressurized.

* * * * *